3,390,166
MESOMERIC PHOSPHONIUM ESTER SALTS AND PROCESS OF PREPARATION

Gail H. Birum, Kirkwood, and Clifford N. Matthews, St. Louis, Mo., assignors to Monsanto Company, St. Louis, Mo., a corporation of Delaware
No Drawing. Filed Mar. 30, 1966, Ser. No. 543,765
19 Claims. (Cl. 260—455)

This invention relates to novel phosphonium ester salts containing mesomeric diphosphonium cation groups and to processes of making them.

The novel mesomeric diphosphonium ester salts of this invention can be represented by the structure:

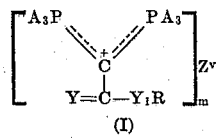
(I)

wherein each A is aryl, R is an organic radical of not more than 20 carbon atoms selected from the group consisting of alkyl, aralkyl, haloaralkyl, alkenyl, aryl, alkaryl and haloaryl, Y and $Y_1$, which may be the same or different, are chalcogen elements having an atomic weight of 16 to 33 (oxygen or sulfur), Z is an anion, $v$ is the actual valence of the anion Z and is an integer from 1 to 2 and $m$ is an integer equal to $v$.

The novel phosphorus ester salts of Formula I, being mesomeric, can be represented by the formulae:

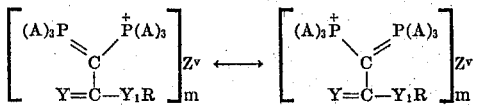

or they can be written to show the equivalence of the two phosphorus atoms as in Formula I above. For the sake of brevity and simplicity the salts of Formula I will sometimes be represented hereinafter by the formula

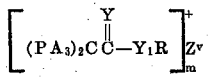

The mesomeric diphosphonium ester salts of Formula I vary from solids to viscous liquids depending upon the nature of the R and $R_1$ substituents and also on the specific anion. They are essentially insoluble in ethers such as diglyme and in hydrocarbons such as benzene, chlorobenzene, toluene, xylene, hexane, cyclohexane and the like, and are generally soluble in lower aliphatic alcohols such as methyl alcohol, ethyl alcohol propyl alcohol, isopropyl alcohol and in methylene chloride, chloroform and acetonitrile.

A subclass of mesomeric diphosphonium ester salts of this invention, preferred because they are prepared in one step and hereinafter referred to therefore as primary products, are compounds represented by Formula I in which Z is selected from the group consisting of Cl, Br and I. These primary products can be represented by the formula

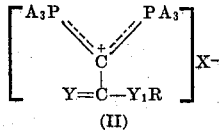
(II)

in which A, R, Y and $Y_1$ are as defined above, and X is selected from the group consisting of Cl, Br and I.

The primary products of this invention are prepared by reaction of hexaphenylcarbodiphosphorane with a compound of the formula

wherein R, Y, $Y_1$ and X are as defined above, in the presence of an inert organic medium which can be either solvent or suspending agent for either or both of the reactants.

The reaction of the primary process of this invention can be summarized according to the following general equation.

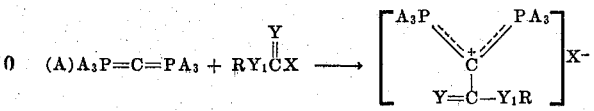

wherein A, Y, $Y_1$ and R are as defined hereinbefore and X is selected from the group consisting of Cl, Br and I.

In carrying out the primary reaction of this invention the hexaphenylcarbodiphosphorane and

reactant can be added separately or concomitantly to the reaction vessel in equimolar amounts or an excess of either reactant can be used. If excess reactant is employed it is generally preferred that it be the

reactant since it can serve as liquid reaction medium for the reaction and is easily separated from the product. Temperature of reaction for process step (A) is not critical and good results can generally be obtained from about 0° C. to 150° C. Temperatures from 20° C. to 100° C. are preferred.

The organic reaction medium employed in process step (A) can be any of the well-known solvents and diluents which are inert to the reactants, e.g. aromatic hydrocarbons such as benzene, toluene and xylene; ethers such as diethyl ether, dibutyl ether, bis(2-methoxyethyl)ether and tetrahydrofuran; and cyclic hydrocarbons such as cyclohexane. The preferred reaction media are the ethers in view of the ease of their removal from the products.

The separation of the desired mesomeric diphosphonium compound from the reaction mixture is readily accomplished by conventional means well known in the art, e.g. filtration, fractional distillation under reduced pressure, selective extraction, fractional distillation using a carrier gas, film distillation, elution or any suitable combination of these methods.

Representative R organic radicals for the compounds of the above formulae prepared by the processes of this invention include by way of example and not limitation alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 20 carbon atoms, alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl having 2 to 20 carbon atoms, aryl such as phenyl, biphenyl, naphthyl, and the like, aralkyl such as benzyl, phenylethyl, diphenylmethyl and the like, and alkaryl such as tolyl, ethylphenyl, xylyl, butylphenyl, tert-butylphenyl, trimethylphenyl, diethylphenyl, methylpropylethylphenyl and the like; haloaryl such as chlorophenyl, bromophenyl, iodophenyl, 2,4-dichlorophenyl, 2,4,6-tribromophenyl, 2,3,4,5,6-pentachlorophenyl and the like; and haloaralkyl such as chlorobenzyl, bromobenzyl, iodobenzyl, chlorophenylethyl, 2,4 - dichlorophenylethyl, di(2,4 - dichlorophenyl)methyl and the like. Within this class R radicals of not more than 12 carbon atoms containing from 0 to 5 halogen atoms are preferred. Representative A aryl radicals for Formula I include by way of example the aryl radicals listed under R above.

The mesomeric diphosphonium ester salts of this invention other than the chloride and bromide salts can be prepared from the primary products by metathesis, halogen addition, and addition of metal halides in which the bond character is more covalent than ionic. Thus Z can be any anion, organic or inorganic. Representative Z inorganic anions include by way of example halides ($Cl^-$, $Br^-$, $F^-$ and $I^-$); inorganic oxyanions such as sulfate, bisulfate, nitrate, phosphate, cyanate, thiocyanate, chlorate, perchlorate, sulfide, bromate, permanganate, phosphonate and the like; perhalide anions such as $I_3^-$, $Br_3^-$, $Cl_3^-$ and interhalogens such as $BrCl_2^-$, $IBr_2^-$, $ICl_2^-$, $ClBr_2^-$ and the like; complex haloanions of phosphorus, silicon and boron such as $PCl_6^-$, $PF_6^-$, $PCl_3F_3^-$, $PBr_6^-$ and the like, $SiF_5$, $BCl_4^-$, $BF_4^-$, $BCl_2F_2^-$, $BBr_2I_2$, $BI_4^-$ and the like; complex hydride anions including a Group III element such as $BH_4^-$, $AlH_4^-$, $GaH_4^-$ and the like; complex metallic halide anions of metals wherein the original metal to halide bond is more covalent than ionic such as Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn and so forth.

The metal halides used in the present invention in the preparation of phosphonium salts wherein the anion is a complex metallic halide anion are those wherein the character of the bond calculated using the electronegativity scale given at page 93 and discussed at pages 97–102 of Linus Pauling's "Nature of the Chemical Bond," 3d ed. (Cornell Univ. Press, 1960) is less than one-half ionic. Representative metal halides which add to the primary products of this invention to form complex metallic halide anions are $AlBr_3$, $AlCl_3$, $AlF_3$, $SbBr_3$, $SbCl_3$, $SbF_3$ $SbF_5$, $SbI_3$, $SbI_5$, $AsBr_3$, $AsCl_3$, $NbCl_5$, $NbF_5$, $NiBr_2$, $NiCl_2$, $AsF_3$, $AsI_3$, $BeBr_2$, $BeCl_2$, $BeF_2$, $BeI_2$, $BiBr_3$, $BiCl_3$, $BiF_3$, $BiI_3$, $CdBr_2$, $NiI_2$, $OsF_6$, $ReCl_3$, $ReCl_6$, $CdCl_2$, $CdF_2$, $CdI_2$, $CeCl_3$, $CoBr_2$, $CoCl_2$, $CoI_2$, $CuBr$, $CuBr_2$, $CuCl$, $CuCl_2$, $SeF_4$, $AgBr$, $AgCl$, $AgF$, $CuI$, $GaBr_3$, $GaCl_3$, $GaI_3$, $AuBr$, $AuBr_3$, $AuCl$, $AuCl_3$, $AuI_3$, $InBr_3$, $InCl_3$, $AgF_2$, $AgI$, $TaF_5$, $TlBr_3$, $InI_3$, $FeBr_2$, $FeBr_3$, $FeCl_2$, $FeCl_3$, $FeF_3$, $FeI_2$, $LaBr_3$, $LaCl_3$, $LaI_3$, $PbBr_2$, $TiCl_3$, $TiF_3$, $SnBr_2$, $SnCl_2$, $PbCl_2$, $PbI_2$, $MnBr_3$, $MnCl_2$, $MnI_2$, $HgBr_2$, $HgBrI$, $HgCl_2$, $HgF_2$, $HgI_2$, $NbBr_5$, $ZnBr_2$, $ZnCl_2$, $ZnF_2$, and so forth.

Representative Z organic anions include by way of example and not limitation organic oxyanions such as carboxylates comprising aliphatic and aromatic mono- and polybasic, wherein the organic radical is hydrocarbon or hydrocarbon substituted by various radicals, such as acetates, benzoate, glutarate, laurates, oleates and the like; anions of organic acids and hydroxyl compounds such as toluenesulfonic acid, phenylphosphinic acid, benzeneboronic acid, phenol, 2,4,6-triphenylphenol and the like; and non-oxyorganic anions of organic substituted metals and boron such as tetraphenylboronate, $[Cr(SCN)_4(NH_3)_2]^-$ and the like.

The preferred Z anions of the novel mesomeric phosphorus salt-forming cations of this invention are the acid anions, inorganic and organic, the perhalide anions and the complex metallic halide anions.

The acid anions are usually reacted with the primary products of Formula II as the free acids or the alkali metal or ammonium salts in order to form additional mesomeric phosphonium ester salts by metathesis. In order to form the perhalogen salts and the complex metallic halide salts of the present invention, the metallic halides and halogens are simply mixed with the primary products of Formula II in suitable organic media. Metathesis, halogen addition and addition of metallic halides can be carried out in the presence of an organic medium at widely varying temperatures depending on the specific reactants with temperatures from 20° C. to 100° C. being preferred. The organic medium is generally selected so that the desired phosphoranium salt precipitates. Alternatively the organic medium can be selected so that the alkali metal or ammonium salt precipitates leaving the desired mesomeric phosphonium salt in solution. Well-known methods of separation and purification such as filtration, decantation, fractional crystallization, extraction, chromatography, selective precipitation by addition of another diluent can be used.

The mesomeric phosphonium ester salts of this invention can be used as pest controlling agents, textile auxiliaries, means for soil amelioration, disinfectants (bactericides and fungicides), detergents, additives for petroleum products and means for flameproofing polymers, ion exchangers and the like.

The following examples further illustrate the invention. Parts and percent are by weight unless otherwise indicated.

Example 1

This example describes the preparation of the hexaphenylcarbodiphosphorane used in the following examples.

A reaction vessel equipped with a stirrer, thermometer and condenser is purged with nitrogen and charged with 79.5 parts of triphenylphosphonium methylenetriphenylphosphorane bromide, 450 parts of diglyme and 5.8 parts (15% excess) of potassium metal. The reaction mixture is stirred under nitrogen at a temperature of about 150° C. for about 45 min. and then filtered to remove potassium bromide. After the filtrate has cooled to room temperature, it is filtered and the product washed with diglyme and ethyl ether and dried under vacuum to give 51 parts (74% yield) of hexaphenylcarbodiphosphorane, M.P. 198–201°, $P^{31}$ NMR spectrum (+4.3 p.p.m. in chlorobenzene).

*Analysis.*—Calcd. for $C_{37}H_{30}P_2$: C, 82.81; H, 5.64; P, 11.55. Found: C, 83.21; H, 5.70; P, 11.64.

Example 2

This example describes the preparation of

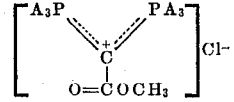

wherein each A represents phenyl. To a mixture of 2.7 parts of hexaphenylcarbodiphosphorane and 20 parts of dry dimethylacetamide under stirring at about 55° C. is added 1.5 parts of methyl chloroformate. Stirring is continued for about 30 min. as the reaction mixture cools to room temperature. Ethyl ether is then added to precipitate the product which is separated by filtration, washed with ethyl ether and air-dried to give 2.6 parts of a light tan powder, M.P. 195–197° C. (dec.).

Example 3

This example describes the preparation of

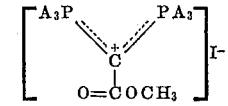

wherein each A represents phenyl. To a mixture of 2.1 parts of the product of Example 2 and 10 parts methyl alcohol is added 5 parts methyl iodide. After about 2 hours the reaction mixture is filtered, and the filtrate is diluted with ethyl ether to precipitate a light yellow solid. The solid is washed with ether, recrystallized from methyl alcohol and then from methyl alcohol-ethyl ether to give 1.5 parts of white solid, M.P. 219–220° C. (dec.); $P^{31}$ NMR spectrum, −21.4 p.p.m.; $H^1$ NMR, −7.64 and −3.08 p.p.m. (10:1 areas). The infrared spectra also confirms the above structure.

*Analysis.*—Calcd. for $C_{39}H_{33}IO_2P_2$: C, 64.83; H, 4.60; $I^-$, 17.56; P, 8.58. Found: C, 64.66; H, 4.65; $I^-$, 17.42; P, 8.46. Addition of $I_2$ to a methyl alcohol solution of the iodide yields the triiodide salt which is precipitated and purified by recrystallization.

Example 4

The mesomeric phosphonium ester salt of Example 3 is prepared by the following alternate synthesis. A flask equipped with a gas delivery tube is purged with $N_2$ and charged with 5.4 parts of hexaphenylcarbodiphosphorane and 40 parts of dimethylacetamide. This mixture is stirred as gaseous $CO_2$ and $N_2$ are introduced below the liquid surface. The $CO_2$ addition is continued for about 12 min. after the yellow color disappears, and then 10 parts of methyl iodide is added rapidly. Ether is added to precipitate a white solid which is separated after about 30 min. by filtration, washed with ether and dried for 12 hours at 80°/0.1 mm. to give 6.1 parts (85%) of product, M.P. 218–219°. A portion of the product salt is recrystallized from methanol, M.P. 219.5–220°; $P^{31}$ NMR spectrum, −21.3 p.p.m.; H' NMR, −7.66 and −3.06 p.p.m. (10:1 areas).

*Analysis.*—Calcd. for $C_{39}H_{33}IO_2P_2$: C, 64.83; H, 4.60; $I^-$, 17.56; P, 8.58. Found: C, 64.89; H, 4.60; $I^-$, 17.60; P, 8.49.

The infrared spectra of this product and the product of Example 3 are essentially identical.

Examples 5 to 34 (Table 1)

Examples 5 to 34 describe the preparation of mesomeric phosphonium ester salts of the formula

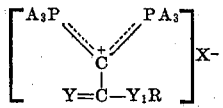

wherein each A represents phenyl and Y, $Y_1$, R and X are as given in Table 1 by reacting hexaphenyldicarbophosphorane with the appropriate compound of the formula

Reaction conditions and purification procedures similar to those employed in Example 2 are used in Examples 5 to 34. Results and further details are given below.

TABLE 1

| Example | R | Y | $Y_1$ | X |
|---|---|---|---|---|
| 5 | Ethyl | O | O | Cl |
| 6 | Propyl | O | S | I |
| 7 | Butyl | S | O | Cl |
| 8 | Amyl | S | S | Cl |
| 9 | Hexyl | O | S | I |
| 10 | Decyl | S | O | Br |
| 11 | Hexadecyl | O | O | Br |
| 12 | Octadecyl | S | O | Cl |
| 13 | Phenyl | O | O | Cl |
| 14 | ----do---- | S | O | Br |
| 15 | Biphenyl | S | S | Br |
| 16 | Chlorophenyl | O | S | Cl |
| 17 | 2,4-dichlorophenyl | O | O | Cl |
| 18 | 2,4-dibromophenyl | O | O | Cl |
| 19 | 2,4,6-trichlorophenyl | S | S | I |
| 20 | Benzyl | O | S | Cl |
| 21 | Phenylethyl | O | O | Br |
| 22 | Chlorophenylethyl | O | O | I |
| 23 | Chlorobenzyl | S | S | I |
| 24 | Bromobenzyl | S | O | I |
| 25 | Methylphenyl | S | S | I |
| 26 | Ethylphenyl | O | S | Br |
| 27 | Diethylphenyl | S | S | Br |
| 28 | Allyl | O | O | I |
| 29 | 2-propenyl | O | O | Cl |
| 30 | 3-butenyl | O | S | Cl |
| 31 | 2-pentenyl | O | O | Cl |
| 32 | 3-pentenyl | S | S | Cl |
| 33 | 2-octenyl | S | S | Cl |
| 34 | 2-methyl-3-pentenyl | O | S | Br |

Examples 35 to 54 (Table 2)

Examples 35 to 54 describe the preparation of various mesomeric phosphonium ester salts of the formula

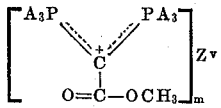

wherein each A represents phenyl and Z is as given in Table 2 by metathesis and addition reactions with a salt of the formula

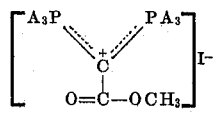

Reaction conditions and purification techniques similar to those employed in Example 3 are used in Examples 35 to 54. Results and further details are given below.

TABLE 2

| Example | Reactant Metathesis | Reactant Addition | Product Z |
|---|---|---|---|
| 35 | | $I_2$ | $I_3$ |
| 36 | | $Cl_2$ | $Cl_2I$ |
| 37 | | $Br_2$ | $Br_2I$ |
| 38 | | $AlI_3$ | $AlI_4$ |
| 39 | | $HgI_2$ | $HgI_3$ |
| 40 | $Na_2SO_4$ | | $SO_4^=$ |
| 41 | NaF | | F |
| 42 | $NaNO_3$ | | $NO_3$ |
| 43 | KCN | | CN |
| 44 | $KPF_6$ | | $PF_6$ |
| 45 | $KPOBr_2Cl_2$ | | $POBr_2Cl_2$ |
| 46 | $NaBF_4$ | | $BF_4$ |
| 47 | $KBH_4$ | | $BH_4$ |
| 48 | $KAlH_4$ | | $AlH_4$ |
| 49 | $CH_3CH_2COONa$ | | $CH_3CH_2COO$ |
| 50 | ¹ $KBA_4$ | | ¹ $BA_4$ |
| 51 | $C_6H_5ONa$ | | $C_6H_5O$ |
| 52 | $K[Cr(SCN)_4(NH_3)_2]$ | | $[Cr(SCN)_4(NH_3)_2]$ |
| 53 | $CF_3COONa$ | | $CF_3COO$ |
| 54 | $KBCl_4$ | | $BCl_4$ |

¹ Wherein each A represents a phenyl group.

What is claimed is:

1. Compounds as represented by the formula

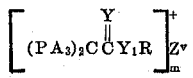

wherein A is phenyl, R is an organic radical of not more than 20 carbon atoms selected from the group consisting of alkyl, aralkyl, haloaralkyl, alkenyl, aryl, alkaryl and haloaryl wherein halo is chloro, bromo or iodo, Y and $Y_1$ selected from the group consisting of oxygen and sulfur, Z is an anion, $v$ is the actual valence of the anion Z and is an integer from 1 to 2, and $m$ is an integer equal to $v$.

2. Compounds of claim 1 wherein Z is selected from the group consisting of Cl, Br and I.

3. Compounds of claim 1 wherein R is alkyl.

4. Compounds of claim 1 wherein R is aryl.

5. Compounds of claim 1 wherein Y and $Y_1$ are oxygen.

6. Compounds of claim 1 wherein Y and $Y_1$ are sulfur.

7. Compounds of claim 1 wherein Y is oxygen and $Y_1$ is sulfur.

8. Compounds of claim 1 wherein Y is sulfur and $Y_1$ is oxygen.

9. Compounds of claim 1 wherein R is methyl.

10. Compounds of claim 1 wherein R is phenyl.

11. Compounds of claim 1 wherein A is phenyl, R is methyl, Z is Cl and Y and $Y_1$ are oxygen.

12. Compounds of claim 1 wherein A and R are phenyl, Y and $Y_1$ are oxygen and Z is Cl.

13. Compounds of claim 1 wherein Z is selected from the group consisting of acid anions, perhalogen anions and complex metallic halide anions.

14. Process of preparing compounds as represented by the formula

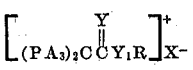

wherein each A is phenyl, X is Cl, Br or I, R is an organic radical of not more than 20 carbon atoms selected from the group consisting of alkyl, aralkyl, haloaralkyl, alkenyl, aryl, alkaryl and haloaryl wherein halo is chloro, bromo or iodo, Y and $Y_1$ are selected from the group consisting of oxygen and sulfur, which comprises reacting hexaphenylcarbodiphosphorane with a compound of the formula $$RY_1\overset{\overset{Y}{\|}}{C}X$$

wherein Y, $Y_1$ R and X are as defined above.

15. Process of claim 14 wherein hexaphenylcarbodiphosphorane is reacted with the compound of the formula $$CH_3O\overset{\overset{O}{\|}}{C}Cl$$

16. Process of claim 14 wherein hexaphenylcarbodiphosphorane is reacted with the compound of the formula

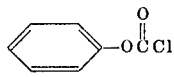

17. Process of claim 14 wherein hexaphenylcarbodiphosphorane is reacted with the compound of the formula $$C_2H_5O\overset{\overset{O}{\|}}{C}Cl$$

18. Process of claim 14 wherein hexaphenylcarbodiphosphorane is reacted with the compound of the formula

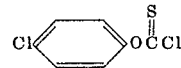

19. Process of claim 14 wherein hexaphenylcarbodiphosphorane is reacted with the compound of the formula $$CH_3S\overset{\overset{S}{\|}}{C}Cl$$

References Cited

Birum et al.: "J.A.C.S.," vol. 88, pp. 4198–4203 (1966).

CHARLES B. PARKER, *Primary Examiner.*

D. R. PHILLIPS, *Assistant Examiner.*